US008047765B2

(12) United States Patent
Wilson et al.

(10) Patent No.: US 8,047,765 B2
(45) Date of Patent: Nov. 1, 2011

(54) DEVICE, SYSTEM AND METHOD FOR THERMALLY ACTIVATED DISPLACEMENT

(75) Inventors: Ian David Wilson, Simpsonville, SC (US); Bradley James Miller, Simpsonville, SC (US); Henry Grady Ballard, Jr., Easley, SC (US); Eric Scicchitano, Montreal (CA)

(73) Assignee: General Electric Company, Schenectady, NY (US)

( * ) Notice: Subject to any disclaimer, the term of this patent is extended or adjusted under 35 U.S.C. 154(b) by 723 days.

(21) Appl. No.: 12/201,406

(22) Filed: Aug. 29, 2008

(65) Prior Publication Data

US 2010/0054912 A1 Mar. 4, 2010

(51) Int. Cl.

| | |
|---|---|
| ***F01B 25/00*** | (2006.01) |
| ***F01D 19/00*** | (2006.01) |
| ***F01D 21/00*** | (2006.01) |
| ***F03B 15/00*** | (2006.01) |
| ***F03D 11/00*** | (2006.01) |
| ***F04B 15/00*** | (2006.01) |
| ***F04B 27/00*** | (2006.01) |

(52) U.S. Cl. ................................ 415/51; 415/41; 415/43

(58) Field of Classification Search .............. 415/41-43, 415/47, 51, 122.1

See application file for complete search history.

(56) References Cited

U.S. PATENT DOCUMENTS

| | | | | |
|---|---|---|---|---|
| 2,886,008 | A * | 5/1959 | Geyer et al. | 91/45 |
| 2,990,145 | A * | 6/1961 | Hougland | 244/78.1 |
| 3,203,275 | A * | 8/1965 | Hoover | 74/665 GA |
| 3,807,447 | A * | 4/1974 | Masuda | 137/596.13 |
| 4,777,715 | A * | 10/1988 | Roberts | 483/30 |
| 5,081,910 | A * | 1/1992 | D'Ascenzo, Jr. | 92/20 |
| 6,494,005 | B2 * | 12/2002 | Zimmerman | 52/296 |
| 6,802,475 | B2 * | 10/2004 | Davies et al. | 244/99.2 |
| 7,309,043 | B2 * | 12/2007 | Good et al. | 244/99.2 |
| 2002/0184885 | A1 * | 12/2002 | Blot-Carretero et al. | 60/776 |

FOREIGN PATENT DOCUMENTS

| | | |
|---|---|---|
| EP | 1624159 A1 | 5/2004 |
| GB | 2099515 A | 12/1982 |

* cited by examiner

*Primary Examiner* — Chris Chu

(74) *Attorney, Agent, or Firm* — Cantor Colburn LLP

(57) ABSTRACT

An actuating device includes: at least one first elongated member having a first coefficient of thermal expansion (CTE); and at least one second elongated member having a second CTE different from the first CTE, the second elongated member being nested within the first elongated member, the device being configured to displace a portion of the device a selected distance along a major axis of the device based on a relationship between the first CTE and the second CTE in response to a change in temperature.

20 Claims, 10 Drawing Sheets

DEVICE, SYSTEM AND METHOD FOR THERMALLY ACTIVATED DISPLACEMENT

BACKGROUND OF THE INVENTION

The subject matter disclosed herein relates to actuators and, more particularly, to devices, methods and systems for thermally activated displacement.

Various systems and devices may include components that are configured to be displaced during operation. Examples of such devices include combustion engines and elevators. In one example, gas turbines such as those used in power generation or aviation utilize a turbine "shroud" disposed in a turbine shell. The shroud provides for a reduced clearance between the tips of buckets disposed on the turbine rotor and the shroud in comparison to a clearance between the bucket tips and the turbine shell, to enhance efficiency by reducing unwanted "leakage" of hot gas over tips of the buckets. Current shroud systems employ solely segmented shrouds connected to the turbine shell and held together by, for example, turbine shell hooks. The clearance between the bucket tips and the shroud is simply driven by the thermal time constant behavior between the turbine shell and rotor/buckets. Cold-built clearances set during assembly, can be set high enough to mitigate rubbing, but tends to increase steady state operating clearances, reducing engine efficiency and output.

Other clearance control or displacement systems employ mechanical, electrical and/or electromechanical actuators, which can suffer degradation in harsh environments such as those found in gas turbines and engines.

Accordingly, there is a need for improved systems and methods for controlling displacement of devices, such as clearances between bucket tips and shrouds in a gas turbine during transient and/or steady state operation of the turbine.

BRIEF DESCRIPTION OF THE INVENTION

An actuating device, constructed in accordance with exemplary embodiments of the invention includes: at least one first elongated member having a first coefficient of thermal expansion (CTE); and at least one second elongated member having a second CTE different from the first CTE, the second elongated member being nested within the first elongated member, the device being configured to displace a portion of the device a selected distance along a major axis of the device based on a relationship between the first CTE and the second CTE in response to a change in temperature.

Other exemplary embodiments of the invention include a method of displacing a portion of an actuating device. The method includes: securing a first end of the actuating device at a fixed position, the actuating device including at least one first elongated member having a first coefficient of thermal expansion (CTE) and at least one second elongated member having a second CTE different from the first CTE, the second elongated member being nested within the first elongated member; applying a thermal source to the device to change a temperature of the device; and displacing a second end of the device a selected distance along a major axis of the device in response to the change in temperature, the selected distance being based on a relationship between the first CTE and the second CTE.

Further exemplary embodiments of the invention include a system for adjusting a clearance in a gas turbine including a turbine rotor and a plurality of buckets. The system includes: a shroud assembly including at least one shroud segment, the at least one shroud segment being disposed in an interior of a turbine shell; and an actuating device extending through at least a portion of the turbine shell and having a first end in a fixed position relative to the turbine shell, the actuating device including: at least one first elongated member having a first coefficient of thermal expansion (CTE); and at least one second elongated member having a second CTE different from the first CTE, the second elongated member being nested within the first elongated member, the device being configured to displace a second end of the device a selected distance along a major axis of the device based on a relationship between the first CTE and the second CTE in response to a change in temperature.

Additional features and advantages are realized through the techniques of exemplary embodiments of the invention. Other embodiments and aspects of the invention are described in detail herein and are considered a part of the claimed invention. For a better understanding of the invention with advantages and features thereof, refer to the description and to the drawings.

DETAILED DESCRIPTION OF THE INVENTION

There is provided a device, system and method for thermally actuated displacement. The system includes a thermally actuating device included in a gas turbine system for adjusting a displacement of a component thereof, such as a clearance between bucket tips and one or more shrouds. Although the actuating device is described in the context of the gas turbine system, the device may be utilized in any system that would benefit from displacement of components by thermal actuation.

The actuating device includes at least one first elongated member having a first coefficient of thermal expansion ("CTE") and at least one second elongated member having a second CTE different from the first CTE. The second elongated member is nested within the first elongated member, and the device is configured to extend a selected distance along a major axis of the device based on a relationship between the first CTE and the second CTE in response to a change in temperature. The elongated member is described herein as a generally cylindrical rod, tube or combination thereof, but may be any suitable shape. A method is provided that includes thermally activating the elongated member to cause a displacement of an end of the member.

Figure 1:
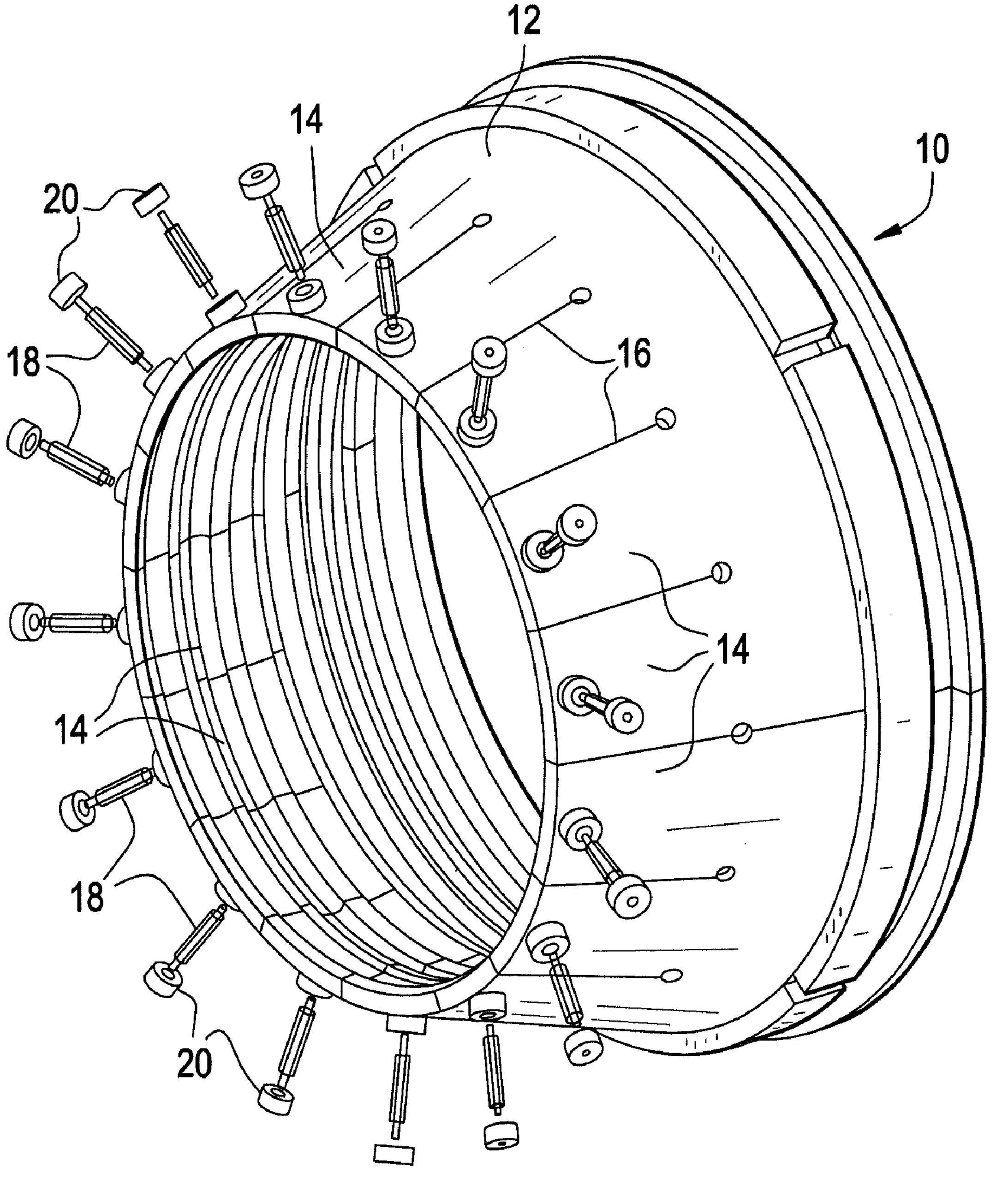
FIG. 1 is a side perspective view of an exemplary embodiment of an inner turbine shell of a gas turbine.

Referring to FIG. 1, a portion of a gas turbine in accordance with an exemplary embodiment of the invention is indicated generally at 10. The gas turbine 10 includes an inner turbine shell 12 configured to engage, for example, a plurality of turbine stages. The turbine shell 12 includes a plurality of segments 14, each of which is separated by a slot 16 and is configured to hold an actuating device 18. In one embodiment, a sealing assembly 20 disposed on each segment 14 engages the actuating device 18 to secure a first end of the actuating device in a fixed position relative to the segment 14. Each actuating device 18, for example, is connected at a second end thereof to a shroud or other component located in the interior of the turbine shell 12. Although the actuating device is described in conjunction with the turbine 10, the actuating device may be utilized with any systems or apparatuses that require axial movement of components.

Figure 2:
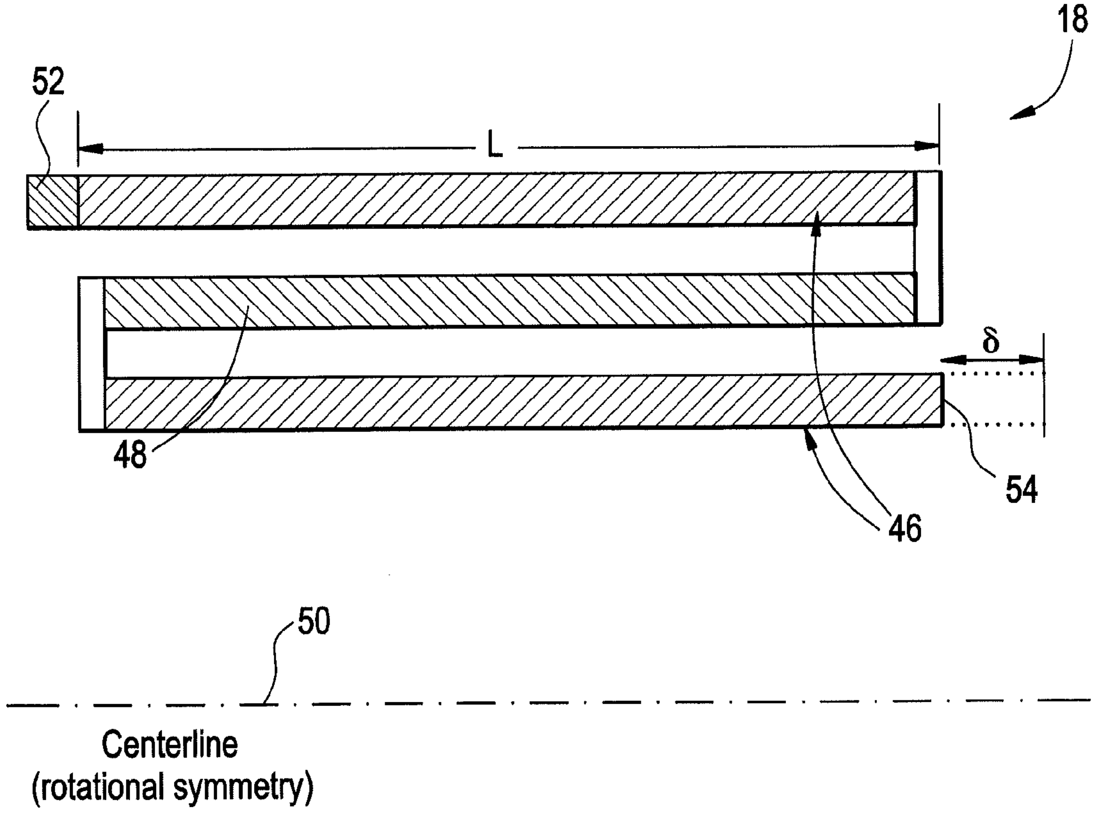
FIG. 2 is a side cross-sectional view of an exemplary embodiment of an actuating device.

Referring to FIG. 2, an embodiment of the actuating device 18 is shown. The actuating device includes at least one first elongated member 46 and at least one second elongated member 48. In one embodiment, the second elongated member 48 is nested in between two first elongated members 46. The first elongated member 46 is made from a first material having a first coefficient of thermal expansion ("CTE"), and the second elongated member 48 is made from a second material having a second CTE different from the first CTE. The actuating device 18 is configured to displace a portion of the device 18 a selected distance along a major axis 50 of the device 18 based on a relationship between the first CTE and the second CTE in response to a change in temperature.

In use, a thermal source, such as an electric current, an electric heater and/or a gas such as air or steam is applied to change the temperature of the device 18. The device 18 has a first end 52 and a second end 54.

In one embodiment, the first end 52 is secured relative to a body such as the turbine shell 12. The first end 52 is secured by any suitable mechanism, such as a bayonet attachment or a threaded attachment. A change in temperature will cause the second end 54 to displace a distance "δ" along the major axis 50.

In one example, the first elongated members 46 have a CTE that is greater than the CTE of the second elongated member 48. An increase in temperature will accordingly cause the second end 54 to displace a distance δ away from the first end 52. This displacement occurs in a telescoping fashion, as each of the first elongated members 46 expand along the major axis 50 by a greater amount than the expansion of the second elongated member 48, which causes the second end 54 to displace farther than it would if a single elongated member 46 were used.

In another example, the first elongated members 46 have a CTE that is less than the CTE of the second elongated member 48. An increase in temperature will accordingly cause the second end 54 to displace a distance δ toward the first end 52, i.e., cause the device 18 to retract. This displacement occurs as the second elongated member 48 expands along the major axis 50 by a greater amount than the first elongated members 46. This retraction effect is also amplified relative to a single elongated member 46.

The first and second elongated members 46, 48 are made from any suitable thermally conductive material having a desired CTE. Examples of such materials include Cr—Mo—V steel, Niobium-strengthened superalloys such as Inconel® 909, stainless steel such as 310SS, and high strength iron-based superalloys such as A286. Although the embodiments described herein describe the first and second elongated members 46, 48 as being in the form of solid or hollow cylindrical members, the first and second elongated members 46, 48 may take any suitable shape.

Figure 3:
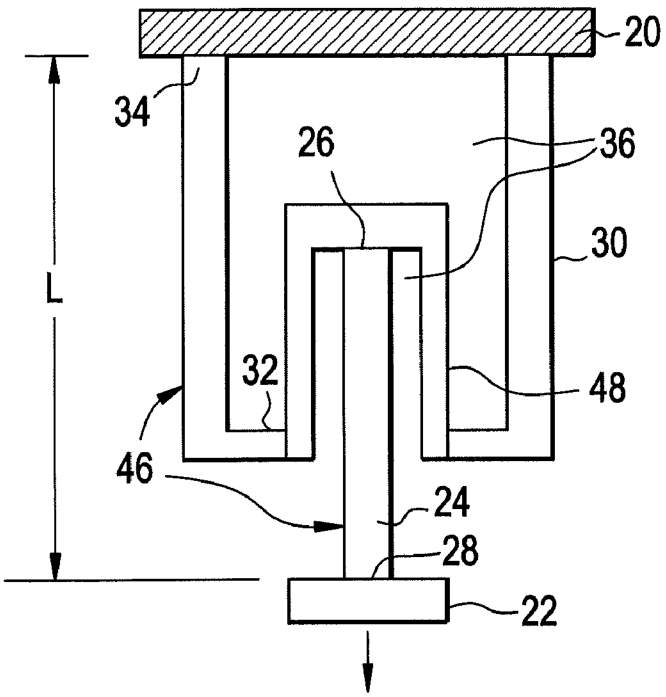
FIG. 3 is a side cross-sectional view of another exemplary embodiment of an actuating device.

Referring to FIG. 3, an embodiment of the actuating device 18 includes a plurality of concentric members, and is connected at one end to a body 20 and at another end to a movable member 22. In this embodiment, the second elongated member 48 forms a hollow cylindrical tube nested between a plurality of the first elongated members 46. The first elongated members 46 include an interior member 24 is disposed within the second elongated member 48, connected at a first end 26 to the second elongated member 48, and connected at a second end 28 to the movable member 22. The first elongated members 46 also include a hollow exterior member 30 surrounding the second elongated member 48, connected at a first end 32 to the second elongated member 48, and connected at a second end 34 to the body 20.

The actuating device 18 forms gas flow paths or cavities 36, allowing air, gas or other materials having selected temperatures to surround the structures of the actuating device 18 to cause the actuating device 18 to expand or retract. Each of the elongated members 46, 48 may also include holes or perforations therethrough to facilitate exposure of the actuating device to the air, gas or other material.

Figure 4:
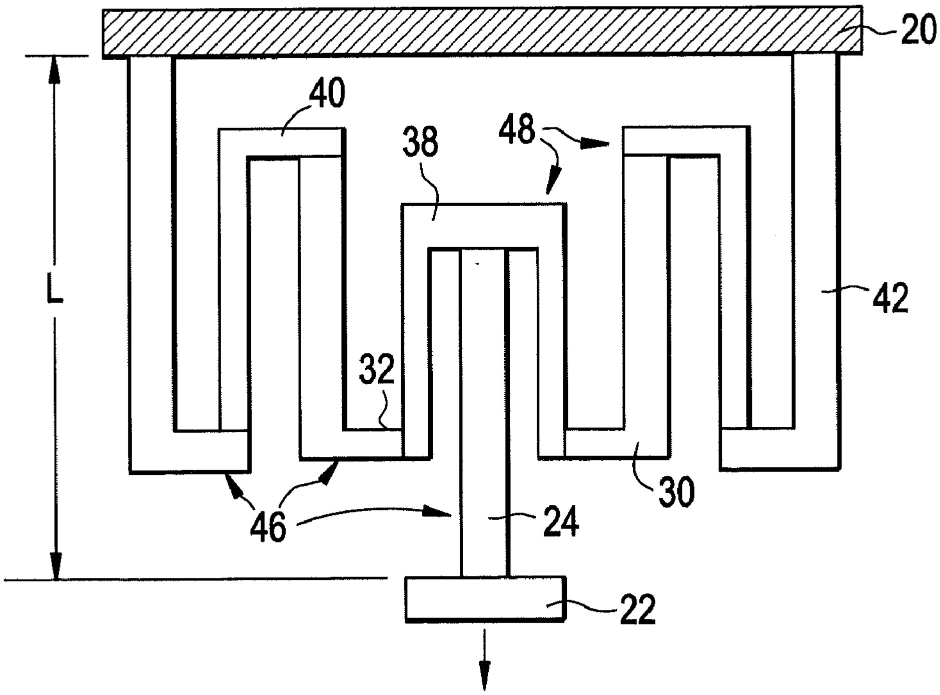
FIG. 4 is a side cross-sectional view of another exemplary embodiment of an actuating device.

Referring to FIG. 4, in one embodiment, the actuator 18 includes additional members to further amplify the displacement effect. Each of the additional members are connected to an additional second elongated member 48 in a concentric fashion. In this embodiment, the second elongated member 48 forms a first cylindrical tube 38 and an additional cylindrical tube 40. The first elongated members 46 include the interior member 24, the exterior member 30 and an additional exterior member 42. The additional cylindrical tube 40 is nested between the exterior member 30 and the additional exterior member 42. The additional exterior member 42 is connected to the body 20. Nesting additional layers of elongated members can increase amplification and hence the distance moved by the member 22 without requiring an increase in length L.

Figure 5:
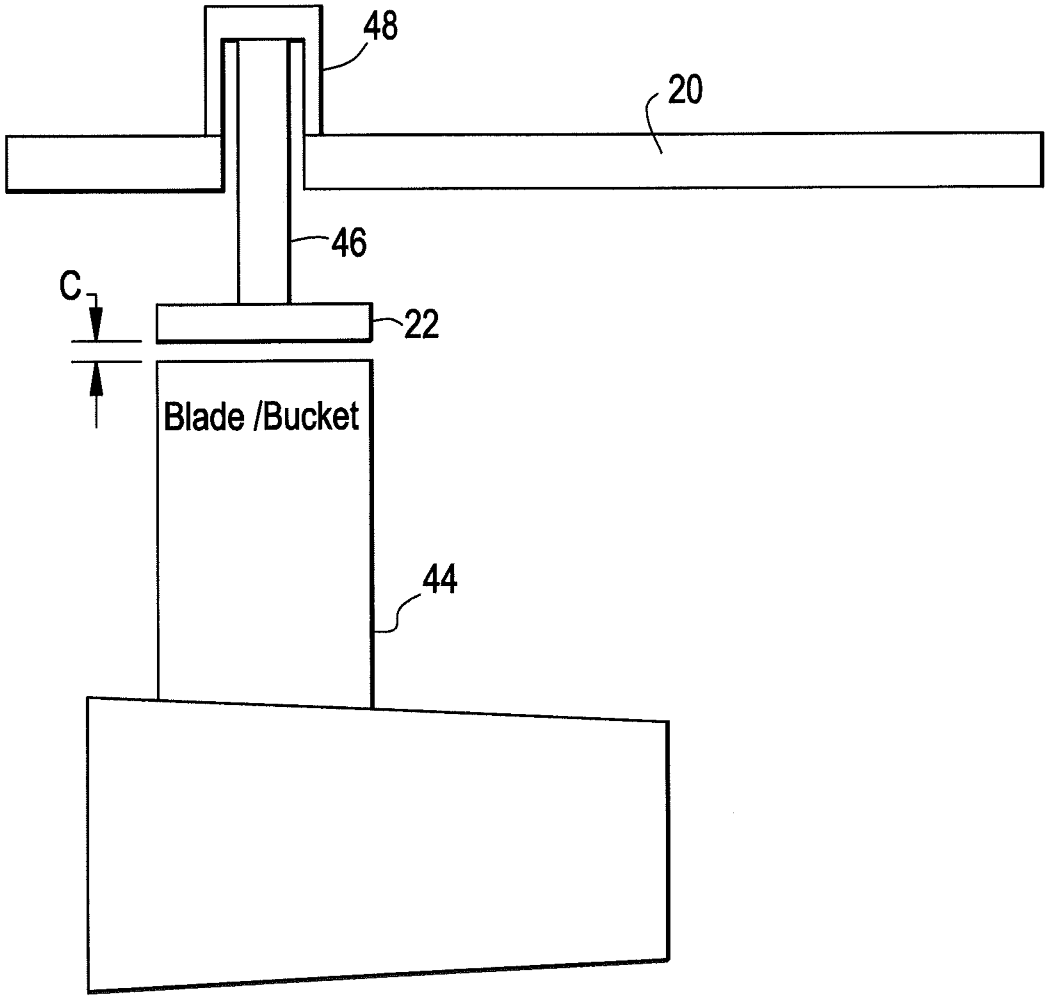
FIG. 5 is a side cross-sectional view of another exemplary embodiment of an actuating device.

Referring to FIG. 5, in one embodiment, the first elongated member 46 is an elongated rod or other member, and the second elongated member forms a hollow cylindrical member connected at one end to the body 20 and at another end to the first elongated member 46. The first elongated member 46 is connected at one end to the second elongated member 48 at one end and at another end to the movable member 22. In one embodiment, the actuating device 18 extends from an exterior of the body 20 through an opening formed through the turbine shell 12 and the second elongated member 48 protruding from the exterior of the body 20.

In one example, the body 20 is a turbine shell and the movable member 22 is a turbine shroud separated from a turbine blade or bucket 44, although this embodiment is not limited thereto. Controlling the temperature of the actuating device 18, such as by exposing the elongated members 46, 48 to air having a selected temperature, to control a clearance "C" between the shroud 22 and the bucket 44.

Figure 6:
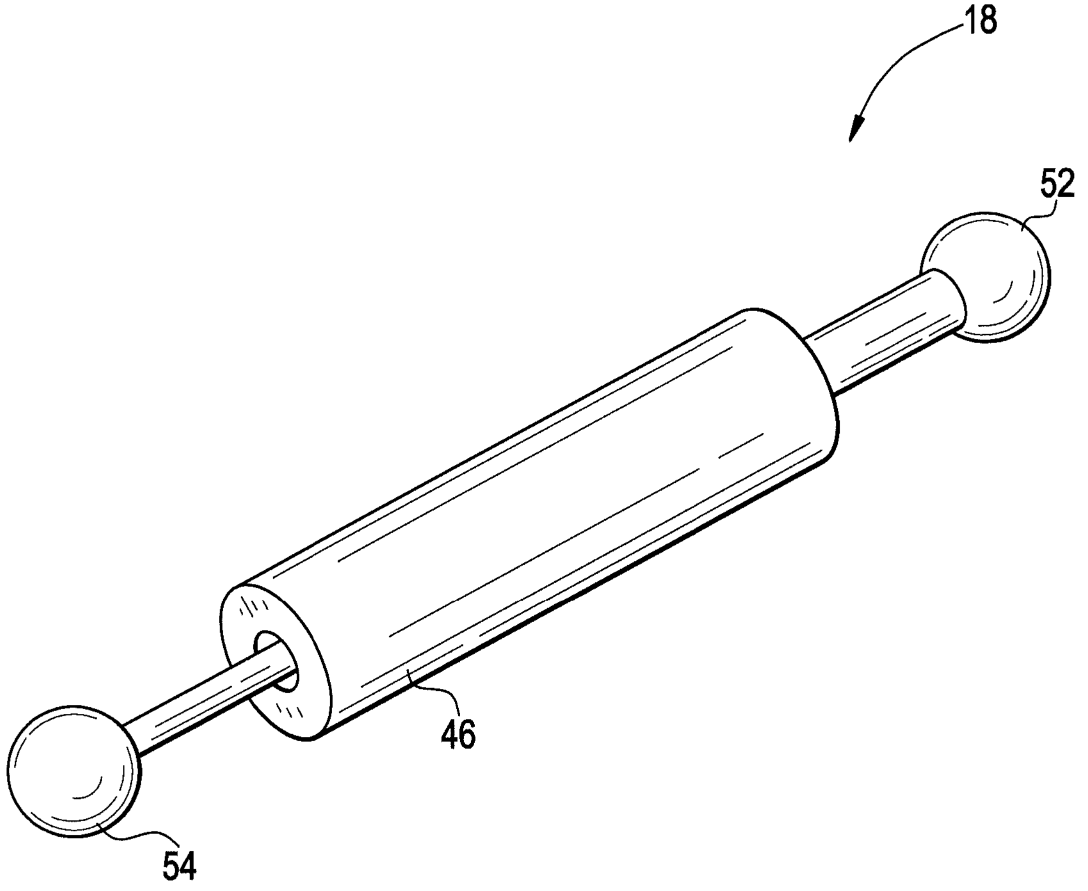
FIG. 6 is a perspective view of another exemplary embodiment of an actuating device.
Figure 7:
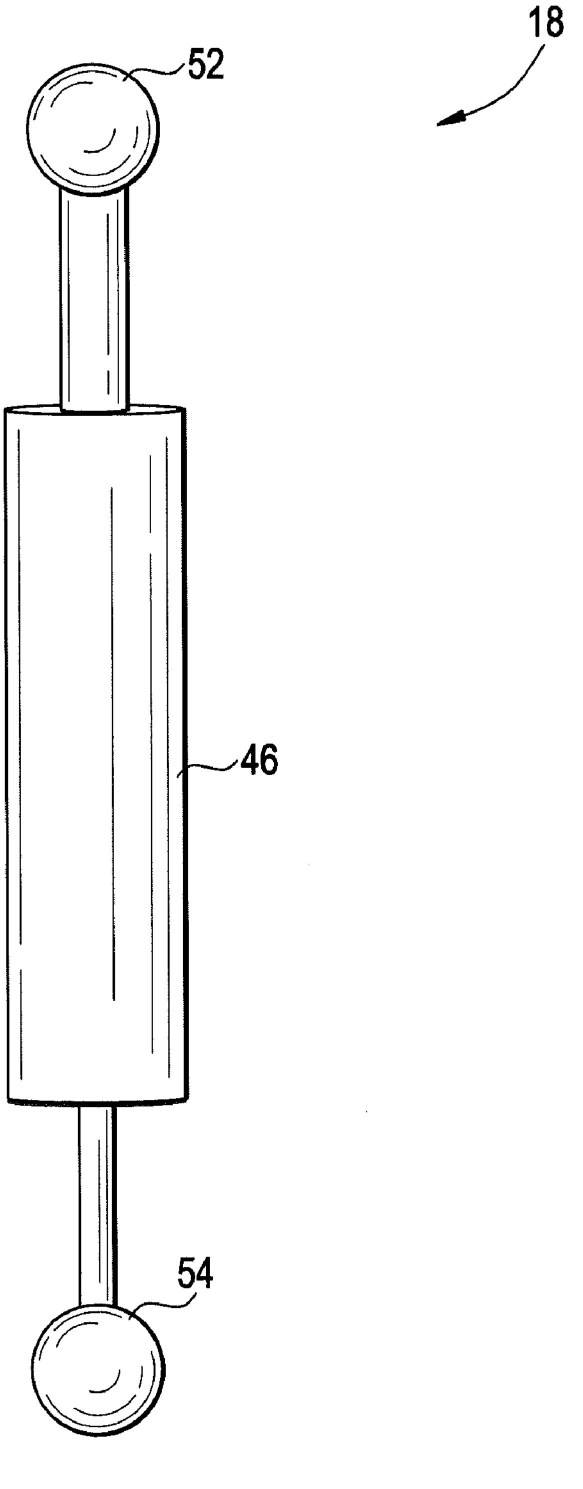
FIG. 7 is a side view of the actuating device of FIG. 6.
Figure 8:
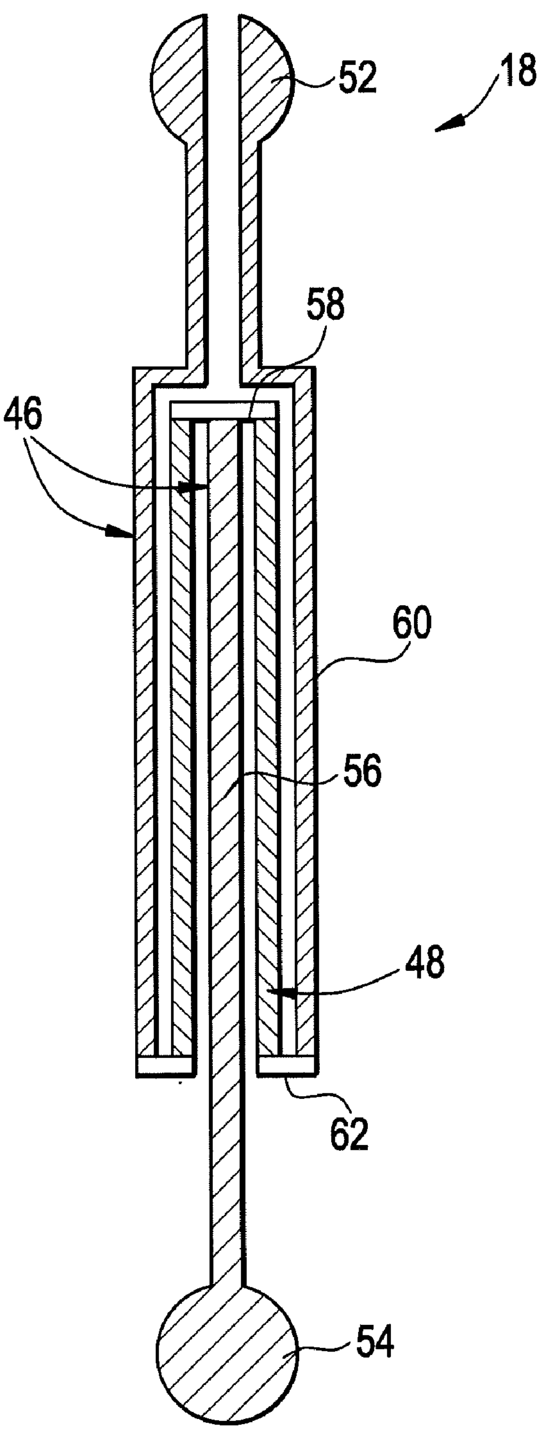
FIG. 8 is a side cross-sectional view of the actuating device of FIG. 6.

Referring to FIGS. 6-8, an embodiment of the actuating device 18 includes a plurality of concentric members. FIGS. 6 and 7 show perspective and side views, respectively, of an exterior of the actuating device 18. FIG. 8 shows a side cross-sectional view of the actuating device 18.

Referring again to FIG. 8, the second elongated member 48 is a hollow cylindrical tube nested between a plurality of the first elongated members 46. In this embodiment, the first elongated members 46 include an interior member 56 disposed within the second elongated member 48 and connected to a first end 58 of the second elongated member 48, and a hollow exterior member 60 surrounding the second elongated member 48 and connected to the second elongated member 48 at a second end 62 thereof.

In one embodiment, the actuating device 18 includes various gas flow paths formed within the actuating device 18. In one embodiment, the gas flow paths are formed by the first and second elongated members 46, 48 and/or by additional conduits formed through selected portions of the elongated members 46, 48. In one example, the hollow exterior member 60 is solid, and the second elongated member 48 includes one or more holes or perforations therethrough.

In another example, the first end 52 is hollow and forms a conduit connecting to the flow paths formed between the hollow exterior member 60 and the second elongated member 48. Optionally, one or more perforations or holes are included in the second elongated member 48 to allow gas to flow between the hollow exterior member 60 and the interior member 56. In another example, the second end 54 is hollow and forms a gas flow conduit therethrough.

In other embodiments, additional exterior members 60 are included to further amplify the displacement effect. Each of the additional exterior members 60 are connected to an additional second elongated member 48 in a concentric fashion.

As indicated above, utilizing different CTE materials for the first and second elongated members 46, 48 results in an amplifying effect on the displacement δ. This amplifying effect results from the fact that the CTE difference, as well as the connections between the first and second elongated members 46, 48 result in the members 46, 48 expanding in opposite directions along the major axis 50.

The relationship between displacement δ and the difference in CTE can be represented by the following equations:

$$\begin{aligned}\delta &= \alpha1 * L * \Delta T - \alpha2 * L * \Delta T + \alpha1 * L * \Delta T\\ &= 2 * \alpha1 * L * \Delta T - \alpha2 * L * \Delta T\end{aligned}$$

where "α1" is the coefficient of thermal expansion (CTE) of the first elongated member 46, "α2" is the CTE of the second elongated member 48, "L" is the length of the active parts of the actuating device 18 along the major axis 50, and "ΔT" is the change in temperature of the actuating device 18. In this embodiment, the active parts are the first and second elongated members 46, 48. In one embodiment, the active parts include any number of elongated members 46, 48.

It follows from this equation that the following relationships between CTE difference and displacement δ exist:

1. If α1=α2/2 then δ=0;
2. If α1>α2/2 then δ>0; and
3. If α1<α2/2 then δ<0.

The relationship between displacement δ and the difference in CTE can be further generalized for any number "n" of first elongated members:

$$\begin{aligned}\delta &= \alpha1 * L * \Delta T - \alpha2 * L * \Delta T + \ldots + \alpha1 * L * \Delta T\\ &= n * \alpha1 * L * \Delta T - (n-1) * \alpha2 * L * \Delta T.\end{aligned}$$

It follows from this equation that the following relationships between CTE difference and displacement δ exist:

1. If α1=(n−1)*α2/n then δ=0;
2. If α1>(n−1)*α2/n then δ>0; and
3. If α1<(n−1)*α2/n then δ<0.

Thus, the amplification of the displacement is achievable by increasing the number of first elongated members 46, which in this embodiment are hollow tubes but may take any desired form. For example, for n=5 and α1=(2)*α2, the displacement would be:

$$\begin{aligned}\delta &= 5 * \alpha1 * L * \Delta T - (5-1) * \alpha1/2 * L * \Delta T\\ &= \alpha1 * L * \Delta T * (5 - (5-1)/2))\\ &= \alpha1 * L * \Delta T * (5 - (5-1)/2))\\ &= 3 * \alpha1 * L * \Delta T.\end{aligned}$$

Thus, for 5 tubes with a difference in CTE of a factor of 2, the displacement amplification of the active parts of the actuating device 18 would be (3*α1*L*ΔT).

Figure 9:
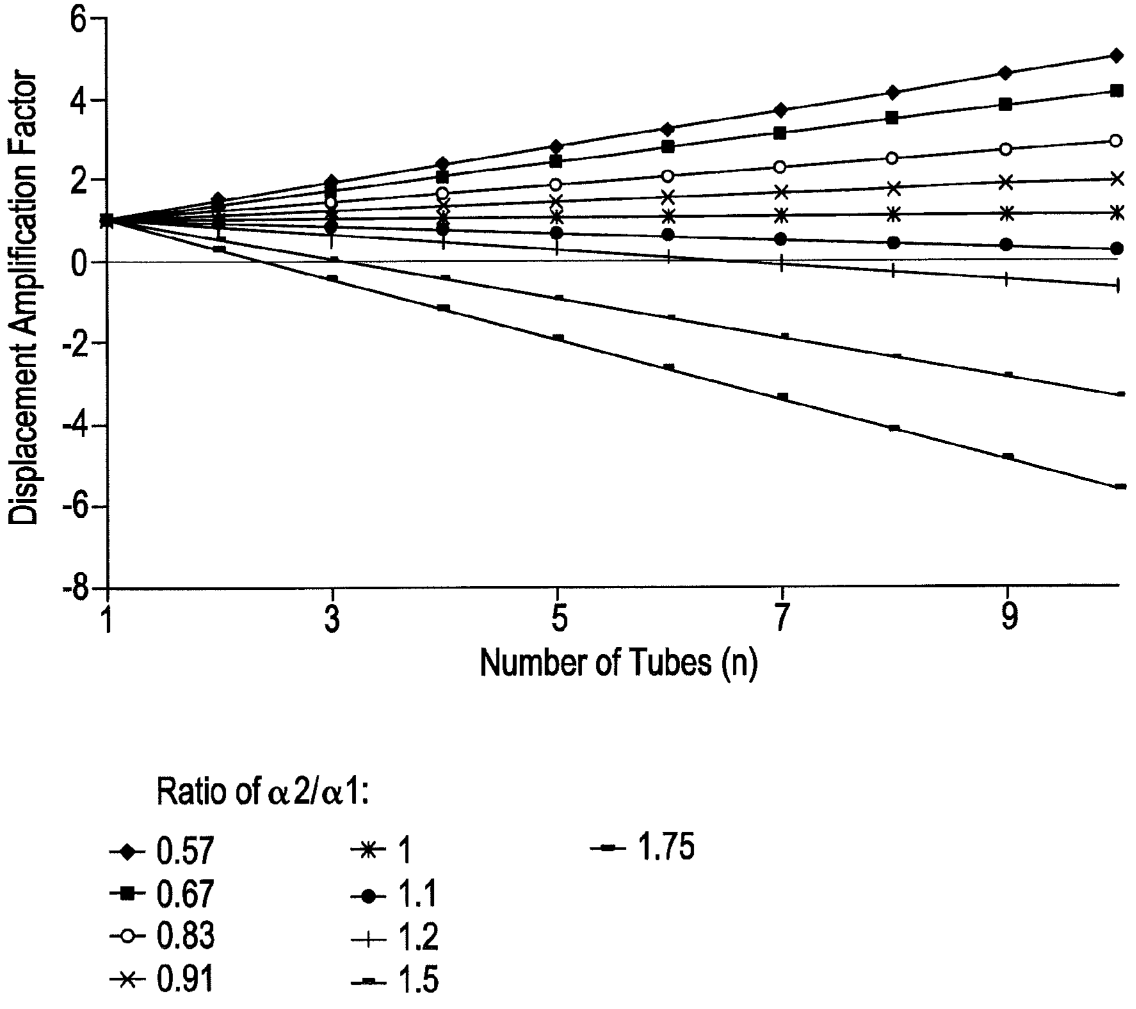
FIG. 9 is a graph showing amplification factors for various exemplary embodiments of the actuating device of FIG. 6.

FIG. 9 is a graph showing the relationship between the amplification factor and number of tubes for a variety of ratios between the first CTE and the second CTE.

Figure 10:
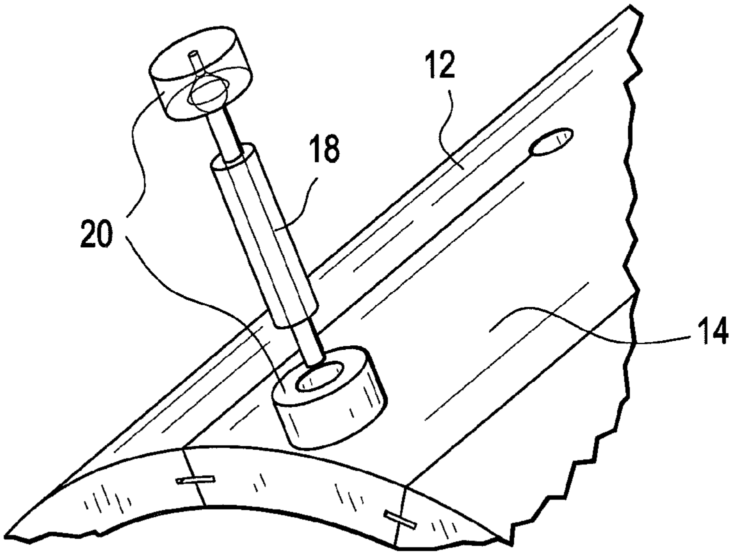
FIG. 10 is a side perspective view of a segment of the inner turbine shell of FIG. 1 including an actuating device.
Figure 11:
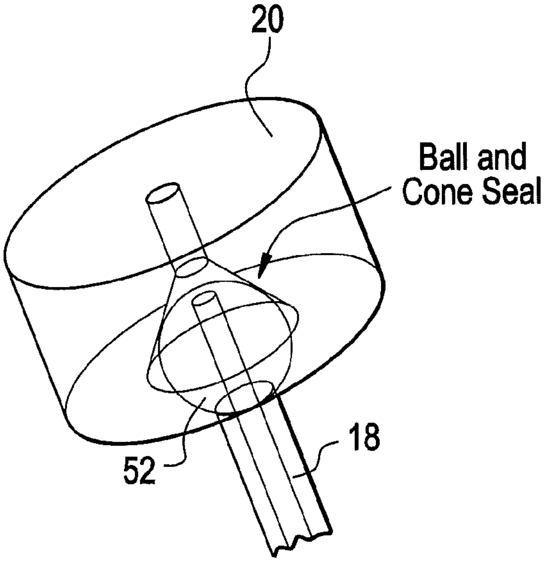
FIG. 11 is a side perspective view of a sealing assembly of the inner turbine shell of FIG. 1.

Referring to FIGS. 10 and 11, an exemplary mechanism for securing the actuating device 18 to the body 20 or turbine shell 12 is shown. In this embodiment, the first end 52 forms a generally spherical shape, and an interior of the sealing assembly 20 includes a conical interior to facilitate a ball and cone seal between the segment 14 and the actuating device 18. In other embodiments, any suitable mechanism is utilized to fixedly connect the first end 52 to the segment 14.

Figure 12:
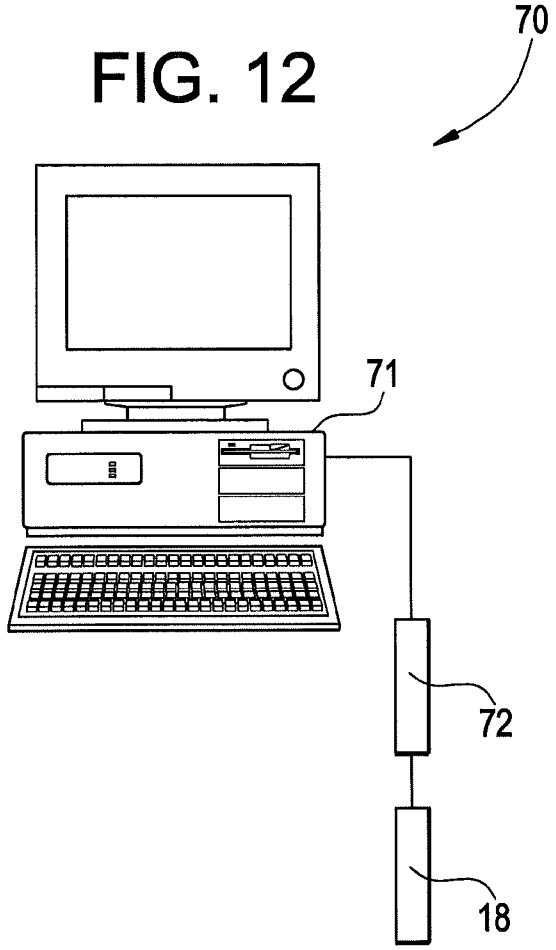
FIG. 12 is an illustration of a system for controlling a thermally activated actuator.

Referring to FIG. 12, there is provided a system 70 for controlling the actuating device 18, for example, to control the clearance between a shroud 20, 24, 26 and one or more bucket tips. The system 70 may incorporate a computer 71 or other processing unit capable of receiving data from users or sensors incorporated with the actuating device 18 and/or the shroud assembly 14. The computer 71, in one embodiment, also is connected to and able to control sources of thermal energy, such as the electric heater 36 and gas, steam and/or air sources. The processing unit may be included with the shroud assembly 14 or included as part of a remote processing unit.

In one embodiment, the system 70 includes a computer 71 coupled to an actuator 72, which is in turn coupled to the actuating device 18 for providing thermal energy to the actuating device 18. A clearance measurement sensor 74 is also coupled to the computer 71 so that the computer 71 can control the actuating device to achieve or maintain a desired clearance. In one embodiment, the actuator 72 includes a heating mechanism such as the electric heater 36 and/or a relay or other switch connected to an electrical power source. In another embodiment, the actuator 72 includes a valve connected to a source of air, gas and/or steam. Exemplary components of the computer 71 include, without limitation, at least one processor, storage, memory, input devices, output devices and the like. As these components are known to those skilled in the art, these are not depicted in any detail herein.

Generally, some of the teachings herein are reduced to instructions that are stored on machine-readable media. The instructions are implemented by the computer 81 and provide operators with desired output.

Figure 13:
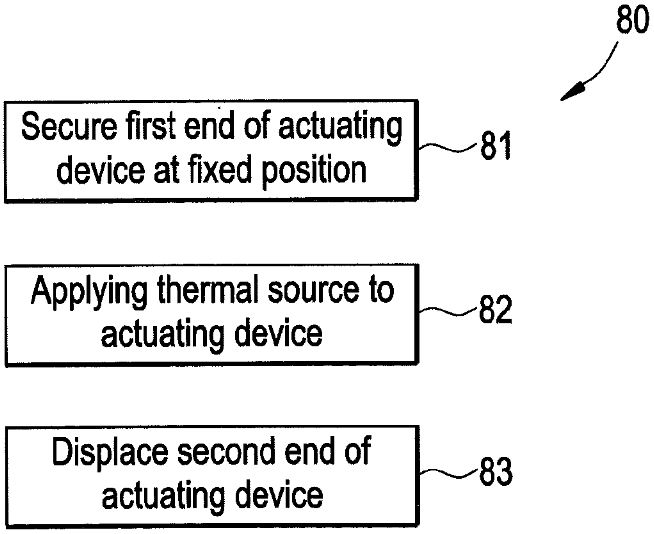
FIG. 13 is a flow chart providing an exemplary method for displacing a portion of an actuating device.

FIG. 13 illustrates an exemplary method 80 for displacing a portion of the actuating device 18, for example, to adjust a clearance in a gas turbine including a turbine rotor and a plurality of buckets. The method 80 includes one or more stages 81-83. In an exemplary embodiment, the method includes the execution of all of stages 81-83 in the order described. However, certain stages may be omitted, stages may be added, or the order of the stages changed. In the exemplary embodiments described herein, the method is described in conjunction with the shroud assembly 14 and the computer 71. However, the method 80 may be performed in conjunction with any type of processor or performed manually, and furthermore be performed in conjunction with any application usable with a thermally displaceable actuator.

In the first stage 81, the first end 52 of the actuating device is secured at a fixed position. For example, the actuating device 18 is secured to the protrusion 34 and/or the turbine shell 12.

In the second stage 82, a thermal source such as the electric heater 36, steam, air and gas is applied to the actuating device 18 to cause displacement of the second end 54. In one embodiment, a thermal source in the form of heated air or gas is introduced to the exterior of the actuating device 18, to interior cavities formed between the first and second elongated members 46, 48, and/or to various conduits formed in the actuating device 18. In one embodiment, a thermal source is applied to the actuating device 18 via the protrusion 34 and/or the inlet 38, to extend or retract the inner shroud 26.

In the third stage 83, in response to the change in temperature as a result of application of the thermal source, the second end 54 of the actuating device 18 is displaced a selected distance along the major axis 50. As discussed above, the selected displacement distance is based on a relationship between the first CTE and the second CTE. In one example, the second end 54 is connected to the inner shroud 26, and application of the thermal source to the actuating device 18 causes corresponding movement of the inner shroud relative to the bucket tips.

In one embodiment, the actuating device 18 is maintained at a selected temperature, such as by applying air from the interior of the turbine shell 12 through the inlet 38, and the actuating device 18 is retracted by applying heat to the protrusion 34 and causing the protrusion 34 to expand and thereby retract the actuating device 18. For example, during transient operation, the electric heater 36 is turned on at the time of maximum pinch between the bucket tip and the inner shroud 26 to expand the protrusion 34 and cause the actuating device 18 to retract.

Although the systems and methods described herein are provided in conjunction with gas turbines, any other suitable type of turbine may be used. For example, the systems and methods described herein may be used with a steam turbine or turbine including both gas and steam generation.

The devices, systems and methods described herein provide numerous advantages over prior art systems. For example, the devices, systems and methods provide the technical effect of allowing active control of the clearance between the bucket tip and the shroud, which will allow a user to run the turbine engine at tighter clearances than prior art systems. These devices, systems and method are a simple and inexpensive means of moving the shrouds independently to control clearances and to account for manufacturing differences.

The devices, systems and methods described herein allow for placement of the actuating device inside the gas turbine and the use of air or other thermal source at a specified temperature to cause the actuator to move. There are no holes to the outside of the turbine that would need to be sealed and there are no parts that have temperature limitations typical of prior art electrical and/or mechanical solutions.

The devices, systems and methods described herein are more reliable, can be used in harsher environments, and require shorter assembly lengths than prior art systems. All of these result in lower costs due to the inherent reliability of the system. Furthermore, the devices, systems and methods herein provide an actuator that can be designed to cause either positive or negative displacement of an end with application of a positive temperature change.

The capabilities of the embodiments disclosed herein can be implemented in software, firmware, hardware or some combination thereof As one example, one or more aspects of the embodiments disclosed can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately. Additionally, at least one program storage device readable by a machine, tangibly embodying at least one program of instructions executable by the machine to perform the capabilities of the disclosed embodiments can be provided.

In general, this written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of exemplary embodiments of the invention if they have structural elements that do not differ from the literal language of the claims, or if they include equivalent structural elements with insubstantial differences from the literal language of the claims.

The invention claimed is:

1. An actuating device comprising:

at least one first elongated member having a first coefficient of thermal expansion (CTE);

at least one second elongated member having a second CTE different from the first CTE, the second elongated member being nested within the first elongated member, the device being configured to displace a portion of the device a selected distance along a major axis of the device based on a relationship between the first CTE and the second CTE in response to a change in temperature.

2. The device of claim 1, wherein the second elongated member is a hollow cylindrical tube, and the at least one first elongated member is a plurality of members.

3. The device of claim 2, wherein the plurality of members includes (i) an interior member disposed within the second elongated member and connected to a first end of the second elongated member, and (ii) a hollow exterior member surrounding the second elongated member and connected to the second elongated member at a second end of the second elongated member.

4. The device of claim 3, wherein the plurality of members includes at least one additional hollow exterior member, the additional exterior member connected to an additional second elongated member, each of the plurality of members forming concentric segments having the at least one second elongated member therebetween.

5. The device of claim 4, wherein the plurality of members are configured in a telescoping configuration.

6. The device of claim 5, wherein an amount of displacement of the second end is based on the following equation:

$$\delta = n*\alpha 1*L*\Delta T-(n-1)*\alpha 2*L*\Delta T,$$

wherein "n" is a number of the plurality of members, "α1" and "α2" are the first CTE and the second CTE respectively, "L" is a length of active parts of the actuating device along the major axis, and "ΔT" is the increase in temperature.

7. The device of claim 1, wherein the device is secured at a first end, and the increase in temperature causes a second end of the device to displace along the major axis.

8. The device of claim 7, wherein the first CTE is greater than half the second CTE, and the increase in temperature causes the second end to displace away from the first end.

9. The device of claim 7, wherein the first CTE is less than half the second CTE, and the increase in temperature causes the second end to displace toward the first end.

10. A method of displacing a portion of an actuating device, the method including:

securing a first end of the actuating device at a fixed position, the actuating device including at least one first elongated member having a first coefficient of thermal expansion (CTE) and at least one second elongated member having a second CTE different from the first CTE, the second elongated member being nested within the first elongated member; and applying a thermal source to the device to change a temperature of the device; and displacing a second end of the device a selected distance along a major axis of the device in response to the change in temperature, the selected distance being based on a relationship between the first CTE and the second CTE.

11. The method of claim 10, wherein the second elongated member is a hollow cylindrical tube, and the at least one first elongated member is a plurality of members.

12. The method of claim 11, wherein the plurality of members includes (i) an interior member disposed within the second elongated member and connected to a first end of the second elongated member, and (ii) a hollow exterior member surrounding the second elongated member and connected to the second elongated member at a second end of the second elongated member.

13. The method of claim 12, wherein the plurality of members includes at least one additional hollow exterior member, the additional exterior member connected to an additional second elongated member, each of the plurality of members forming concentric segments having the at least one second elongated member therebetween.

14. The method of claim 13, wherein the plurality of members are configured in a telescoping configuration.

15. The method of claim 14, wherein the first CTE is greater than half the second CTE, and applying the thermal source includes increasing the temperature to cause the second end to displace away from the first end.

16. The method of claim 14, wherein the first CTE is less than half the second CTE, and applying the thermal source includes increasing the temperature to cause the second end to displace toward the first end.

17. A system for adjusting a clearance in a gas turbine including a turbine rotor and a plurality of buckets, the system comprising:

a shroud assembly including at least one shroud segment, the at least one shroud segment being disposed in an interior of a turbine shell; and an actuating device extending through at least a portion of the turbine shell and having a first end in a fixed position relative to the turbine shell, the actuating device including:

at least one first elongated member having a first coefficient of thermal expansion (CTE);

at least one second elongated member having a second CTE different from the first CTE, the second elongated member being nested within the first elongated member, the device being configured to displace a second end of the device a selected distance along a major axis of the device based on a relationship between the first CTE and the second CTE in response to a change in temperature.

18. The system of claim 17, wherein the second elongated member is a hollow cylindrical tube, and the at least one first elongated member is a plurality of members, the plurality of members including (i) an interior member disposed within the second elongated member and connected to a first end of the second elongated member, and (ii) a hollow exterior member surrounding the second elongated member and connected to the second elongated member at a second end of the second elongated member.

19. The system of claim 18, wherein the plurality of members includes at least one additional hollow exterior member, the additional exterior member connected to an additional second elongated member, each of the plurality of members forming concentric segments having the at least one second elongated member therebetween.

20. The system of claim 19, wherein the plurality of members are configured in a telescoping configuration.

* * * * *